United States Patent [19]

Kulka et al.

[11] Patent Number: 5,483,827
[45] Date of Patent: Jan. 16, 1996

[54] ACTIVE INTEGRATED CIRCUIT TRANSPONDER AND SENSOR APPARATUS FOR SENSING AND TRANSMITTING VEHICLE TIRE PARAMETER DATA

[75] Inventors: Harvey J. Kulka, Briuon; John H. Schramm, Ann Arbor, both of Mich.

[73] Assignee: Computer Methods Corporation, Livonia, Mich.

[21] Appl. No.: 254,026

[22] Filed: Jun. 3, 1994

[51] Int. Cl.⁶ .................................................. B60C 23/00
[52] U.S. Cl. .............................................. 73/146.5; 73/706
[58] Field of Search .................................. 340/58; 73/706, 73/146.5

[56] References Cited

U.S. PATENT DOCUMENTS

| | | |
|---|---|---|
| 2,274,557 | 2/1942 | Morgan et al. . |
| 3,232,330 | 2/1966 | Puls . |
| 3,613,075 | 10/1971 | Griffiths et al. ........................ 340/58 |
| 3,723,966 | 3/1973 | Mueller et al. . |
| 3,770,040 | 11/1973 | DeCicco . |
| 3,787,806 | 1/1974 | Church . |
| 3,893,228 | 7/1975 | George et al. . |
| 4,010,354 | 3/1977 | Apicella, Jr. et al. . |
| 4,067,235 | 1/1978 | Markland et al. ..................... 73/146.5 |
| 4,074,227 | 2/1978 | Kalmus ................................ 340/58 |
| 4,137,520 | 1/1979 | Deveau . |
| 4,160,234 | 7/1979 | Karbo et al. . |
| 4,199,991 | 4/1980 | Kodama .............................. 73/706 |
| 4,237,728 | 12/1980 | Betts et al. . |
| 4,317,126 | 2/1982 | Gragg, Jr. . |
| 4,392,382 | 7/1983 | Myers . |
| 4,446,447 | 5/1984 | McNamara . |
| 4,450,431 | 5/1984 | Hochstein . |
| 4,543,457 | 9/1985 | Peterson et al. . |
| 4,570,152 | 2/1986 | Melton et al. . |
| 4,578,992 | 4/1986 | Galasko et al. . |
| 4,588,978 | 5/1986 | Allen . |
| 4,695,823 | 9/1987 | Vernon ............................... 340/58 |
| 4,701,826 | 10/1987 | Mikkor . |
| 4,717,905 | 1/1988 | Morrison, Jr. et al. . |
| 4,730,188 | 3/1988 | Milheiser ........................... 340/825 |
| 4,734,034 | 3/1988 | Maness et al. . |
| 4,845,649 | 7/1989 | Eckardt et al. . |
| 4,851,809 | 7/1989 | McAlister ........................... 340/442 |
| 4,856,993 | 8/1989 | Maness et al. . |
| 4,862,486 | 8/1989 | Wing et al. ........................... 377/16 |
| 4,911,217 | 3/1990 | Dunn et al. . |
| 5,061,917 | 10/1991 | Higgs et al. ........................ 340/539 |
| 5,165,281 | 11/1992 | Bell .................................. 73/718 |
| 5,181,975 | 1/1993 | Pollack et al. ................... 152/152.1 |
| 5,218,861 | 6/1993 | Brown et al. . |
| 5,228,337 | 7/1993 | Sharpe et al. . |
| 5,231,872 | 8/1993 | Bowler et al. . |
| 5,235,850 | 8/1993 | Schurmann . |
| 5,247,831 | 9/1993 | Fioravanti . |
| 5,285,189 | 2/1994 | Nowicki et al. .................... 340/447 |
| 5,319,354 | 6/1994 | Myatt ................................ 340/572 |
| 5,348,067 | 9/1994 | Myatt ............................. 152/152.1 |

FOREIGN PATENT DOCUMENTS 544136  11/1992  European Pat. Off. .

*Primary Examiner*—Hezron E. Williams
*Assistant Examiner*—Jewel V. Artis
*Attorney, Agent, or Firm*—Basile and Hanlon

[57] ABSTRACT

An active integrated circuit transponder with on-board power supply is mounted in or on a vehicle tire. A pressure sensor, a temperature sensor and a tire rotation sensor are mounted on a substrate along with the integrated circuit transponder chip, the power supply and an antenna. Upon receiving an interrogation signal from a remote source, the transponder activates the sensors to sense tire pressure and temperature and transmits an encoded radio frequency signal to the remote source containing serial, encoded tire identification, tire position on the vehicle, current tire pressure, current tire temperature and accumulated tire revolutions, as well as maximum and/or minimum tire and temperature pressure values encountered over a predetermined time period and other information specific to the tire.

62 Claims, 6 Drawing Sheets

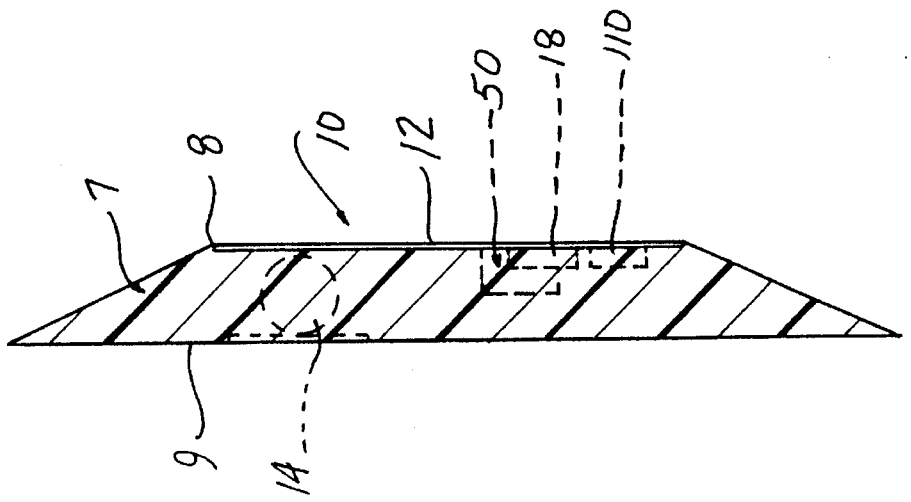
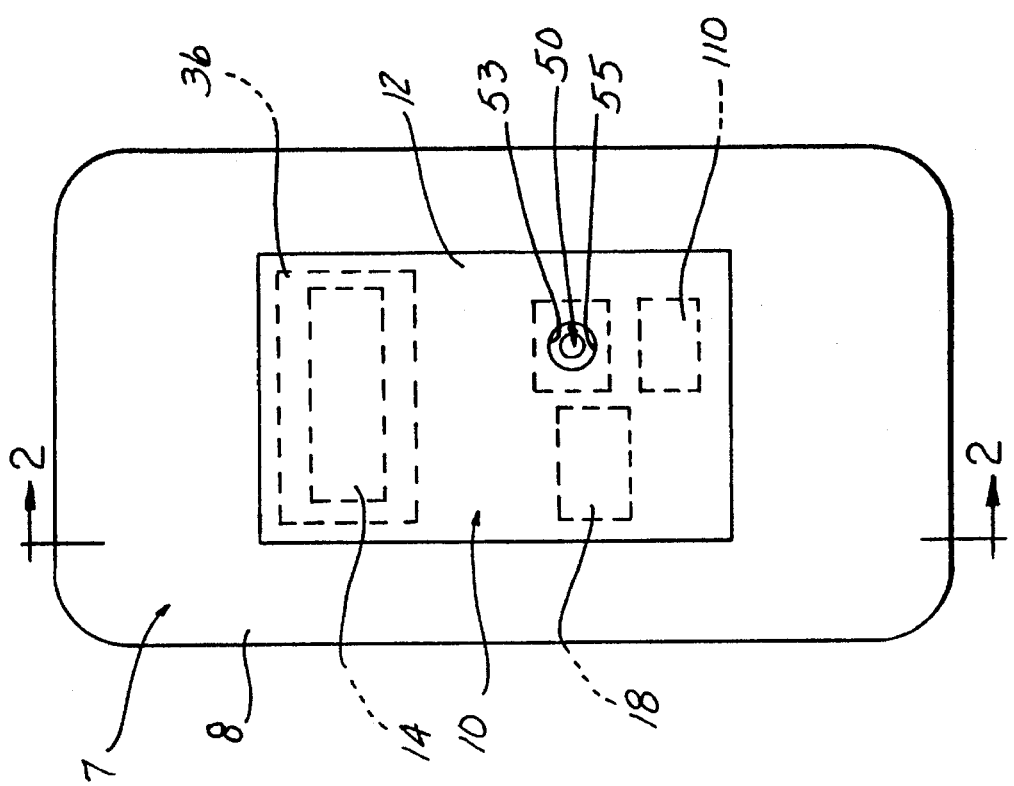

ACTIVE INTEGRATED CIRCUIT TRANSPONDER AND SENSOR APPARATUS FOR SENSING AND TRANSMITTING VEHICLE TIRE PARAMETER DATA

BACKGROUND OF THE INVENTION

The present invention relates, in general, to vehicle tires and, more specifically, to transponders mounted in or on vehicle tires for transmitting tire identification and/or operating condition data.

DESCRIPTION OF THE ART

Recently there has developed interest in mounting transponders in or on a vehicle tire to provide tire identification data during the manufacture and use of the tire. Further developments have led to the mounting of such transponders in the tire to sense and transmit tire pressure data along with tire identification data, as shown in U.S. Pat. Nos. 4,911,217; 5,181,975 and 5,218,861.

The devices disclosed in these and other related patents utilize a passive integrated circuit transponder which is mounted directly within the tire during the manufacture of the tire or under a patch attached to an exterior side wall of the tire. The transponder responds to an interrogation signal from a unit external to the tire and uses the interrogation signal as a source of electrical energy to transmit digital signals relating to a tire identification code and/or tire pressure data. Due to the mounting of the transponder within the tire in close proximity to the steel belts found in most vehicle tires, a specially constructed antenna is required. Such antennas are in the form of two spaced electrodes or a coil of wire turns. Further, such transponders are required to be mounted in a specific location within the tire in order to receive and transmit signals at adequate signal strength levels without interference.

In addition to a unique tire identification code for a tire which is stored in a memory on the integrated circuit transponder, such devices also incorporate a pressure sensor mounted on the circuit board containing the transponder to provide tire pressure data at the time of receipt of the interrogation signal. Such pressure sensors are in the form of an elastomeric material having a variable conductivity, as well as piezo-resistive transducers, silicone capacitive pressure transducers, or a variable conductant laminant of conductive ink. The transponder includes circuitry for digitizing the pressure data for transmission with or without tire identification data to the external interrogation source.

U.S. Pat. No. 4,695,823 discloses a transponder with an internal or on-board power supply in the form of a long period oscillator connected to a battery. The oscillator actuates a temperature and/or pressure sensor at a set time to obtain the temperature and pressure of the tire. The sensed temperature and pressure are compared with preset temperature and pressure threshold values and, when the threshold values are exceeded, the transponder transmits an encoded signal representative of the out-of-range temperature or pressure signal to a remote location, such as a light display mounted on the vehicle to provide an indication that at least one of the temperature and pressure threshold values have been exceeded.

However, such tire mounted transponders, while effectively transmitting tire identification and certain tire pressure or temperature data, are not without limitation. Most of the previously devised tire mounted transponders are passive and receive electrical power from an external interrogation signal source. This limits the effective distance range between the external interrogation signal source and the transponder. Indeed, such external interrogation sources have utilized a hand-held wand which must be placed immediately adjacent to the tire to transmit the interrogation signal to the transponder on the tire and to receive the data signals therefrom.

Such tire mounted transponders have also required special antenna configurations and mounting positions on the tire to provide adequate data signal strength. Further, since such transponders are actuated only upon the receipt of an interrogation signal or at a set time through an on-board oscillator, such transponders only transmit instantaneous pressure and temperature data at the time of receipt of the interrogation signal or the activation signal from the on-board oscillator. Such transponders are incapable of actively accumulating pressure and temperature data, such as maximum or minimum tire pressure and temperature, over a set period of use of the tire. Such tire mounted transponders are also incapable of determining the actual usage of the tire in terms of miles of use. The aforementioned maximum and minimum temperature and pressure, as well as the amount of use of a tire, are extremely useful parameters in determining the condition of the tire in order to extend wear, remaining useful life, safe or unsafe tire condition, etc.

Thus, it would be desirable to provide an integrated circuit transponder which can be mounted in a large number of different positions within or on a vehicle tire without the need for a special antenna configuration. It would also be desirable to provide a tire mounted integrated circuit transponder which operates in an active, continuous mode to automatically and continuously record tire operating parameters during the use of the tire on a vehicle. It would also be desirable to provide a tire mounted integrated circuit transponder which stores such tire operating parameters for subsequent transmission to an external control source upon receipt of an interrogation signal from the external control source. It would also be desirable to provide a tire mounted integrated circuit transponder which is capable of monitoring various tire operating parameters, including pressure, temperature and number of revolutions of the tire, over a predetermined time period and to detect maximum and minimum values of at least certain of such parameters. It would also be desirable to provide a tire mounted integrated circuit transponder which is operable, without repair or part replacement, for the entire expected life of the tire. Finally, it would be desirable to provide a tire mounted integrated circuit transponder which is capable of receiving interrogation signals from an external control source and for transmitting tire operating parameter data to the external control source over longer distances as compared to previously devised tire mounted transponders.

SUMMARY OF THE INVENTION

The present invention is an active integrated circuit transponder and sensor apparatus for sensing and transmitting vehicle tire condition parameters to a remote location external of a vehicle.

The transponder includes a substrate which is mounted within or on a tire. An integrated circuit chip including a processor means is mounted on the substrate and also includes a memory storing a control program executed by the processor means. A receiver means is formed as an integral part of the integrated circuit chip and is connected to the processor means for receiving an interrogation signal from a remote interrogation source. A transmitter means is also formed as an integral part of the integrated circuit chip and is connected to the processor means for transmitting an encoded signal containing the sensed tire parameters to the remote interrogation source.

Sensor means are mounted on the substrate for sensing one or more tire parameters, such as pressure, temperature and/or number of revolutions of the tire. The sensor means outputs signals to the processor means representative of the sensed tire parameter.

A power supply is mounted on the substrate for supplying electrical power to the processor means, the receiver means, the transmitter means and the sensor means. An antenna means is also mounted on the substrate for communicating the interrogation signal from the remote interrogation source to the receiver means and for communicating the encoded data signal from the transmitter means to the remote interrogation source.

In a preferred embodiment, the antenna means comprises a patch antenna mounted directly on the substrate. The sensor means may comprise a pressure sensor mounted on the substrate for sensing the air pressure of the tire. A temperature sensor is also mounted on the substrate for sensing the temperature of the tire. A tire revolution sensor is also mounted on the substrate and detects each complete 360° revolution of the tire.

The output signals from each of the sensors are input to the processor. The pressure and temperature sensor output signals are compared with previous or preset maximum and/or minimum pressure and temperature values, with such maximum and minimum values being updated and stored in the memory as necessary.

Upon receipt of an interrogation signal from a remote interrogation source, the processor activates the sensors to sense current tire pressure and temperature and then transmits a serial, encoded radio frequency signal via the transmitter to the remote interrogation source containing encoded data representations of the sensed tire parameters, including current tire pressure and temperature, accumulated tire revolution count, maximum and minimum pressure and temperature over a predetermined time period, as well as tire identification code, the specific tire location on the vehicle, and other useful tire condition data stored in the memory.

The remote interrogation source comprises a suitable control which transmits a radio frequency interrogation signal over a predetermined distance when the vehicle containing the transponder of the present invention is within the predetermined distance. The control also receives the radio frequency signal from the identified transponder and either stores such data and/or retransmits such data to an external host computer for analysis, storage, etc. The control also retransmits the data to the processor or the transponder for storage in the memory thereof.

The unique transponder of the present invention overcomes certain of the limitations encountered with previously devised tire mounted transponders. The present transponder includes an active power source which enables the transponder, when mounted directly within the tire or on a side wall of the tire, to sense pressure, temperature and total tire revolutions throughout the entire life of the tire. Such values are stored in the memory in the transponder along with maximum and minimum pressure and temperature values as well as an accumulative tire revolution count.

The transponder of the present invention is in the form of an integrated circuit which is mounted along with the on-board power supply and the various sensors on a single substrate thereby facilitating the easy mounting of the transponder within or on a vehicle tire in a number of different possible mounting positions. The power source provides sufficient power to receive and transmit tire parameter data throughout the entire useful life of the tire, including several recappings of a tire.

BRIEF DESCRIPTION OF THE DRAWING

The various features, advantages and other uses of the present invention will become more apparent by referring to the following detailed description and drawing in which:

FIG. 1 is a plan view of an integrated circuit transponder constructed in accordance with the teachings of the present invention with a portion of the encapsulating material removed to show the components mounted therein;

FIG. 2 is a cross sectional view generally taken along line 2—2 in FIG. 1;

DESCRIPTION OF THE PREFERRED EMBODIMENTS

Figure 3:
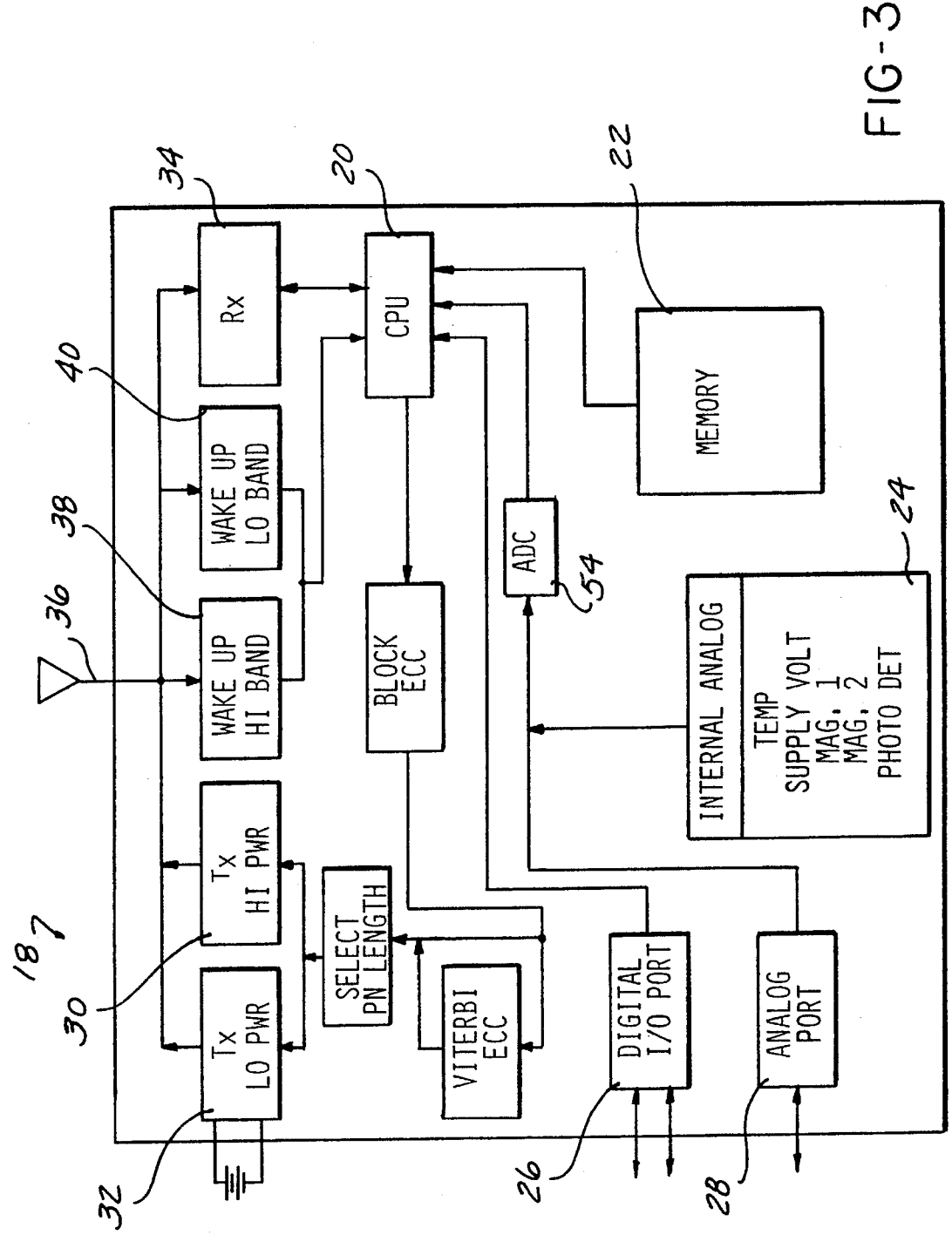
FIG. 3 is a block diagram of the radio frequency identification communication unit of the integrated circuit transponder shown in FIGS. 1 and 2.

Referring now to the drawing, and to FIGS. 1 and 2 in particular, there is depicted a transponder 10 which is suitable for mounting within or on a vehicle tire and which operates to sense and transmit various tire condition parameters to a remote interrogation unit.

The transponder 10 includes an electrically insulating substrate 12. Preferably, the substrate 12 is flexible to enable its conformance to the shape of a tire when mounted within or on a vehicle tire, as described hereafter. By way of example only, the substrate is formed of a flexible polyamide film sold under the registered trademark "KAPTON".

The substrate 12 and all of the components of the transponder 10 mounted on or adjacent to the substrate 12 are housed in an encapsulating medium 7 formed of a suitable material. Preferably, the encapsulating medium 7 is formed of a cured rubber for compatibility with a vehicle tire. The medium 7 may be formed to any desired shape. By way of example only, the medium 7 is formed with a first, substantially planar surface 8, an opposed, planar, second surface 9 and tapering side walls joining the first and second surfaces 8 and 9. The substrate 12, while surrounded by the encapsulating medium on one major surface, has an opposed major surface exposed on the first surface 8 for reasons which will become more apparent hereafter.

Figure 4:
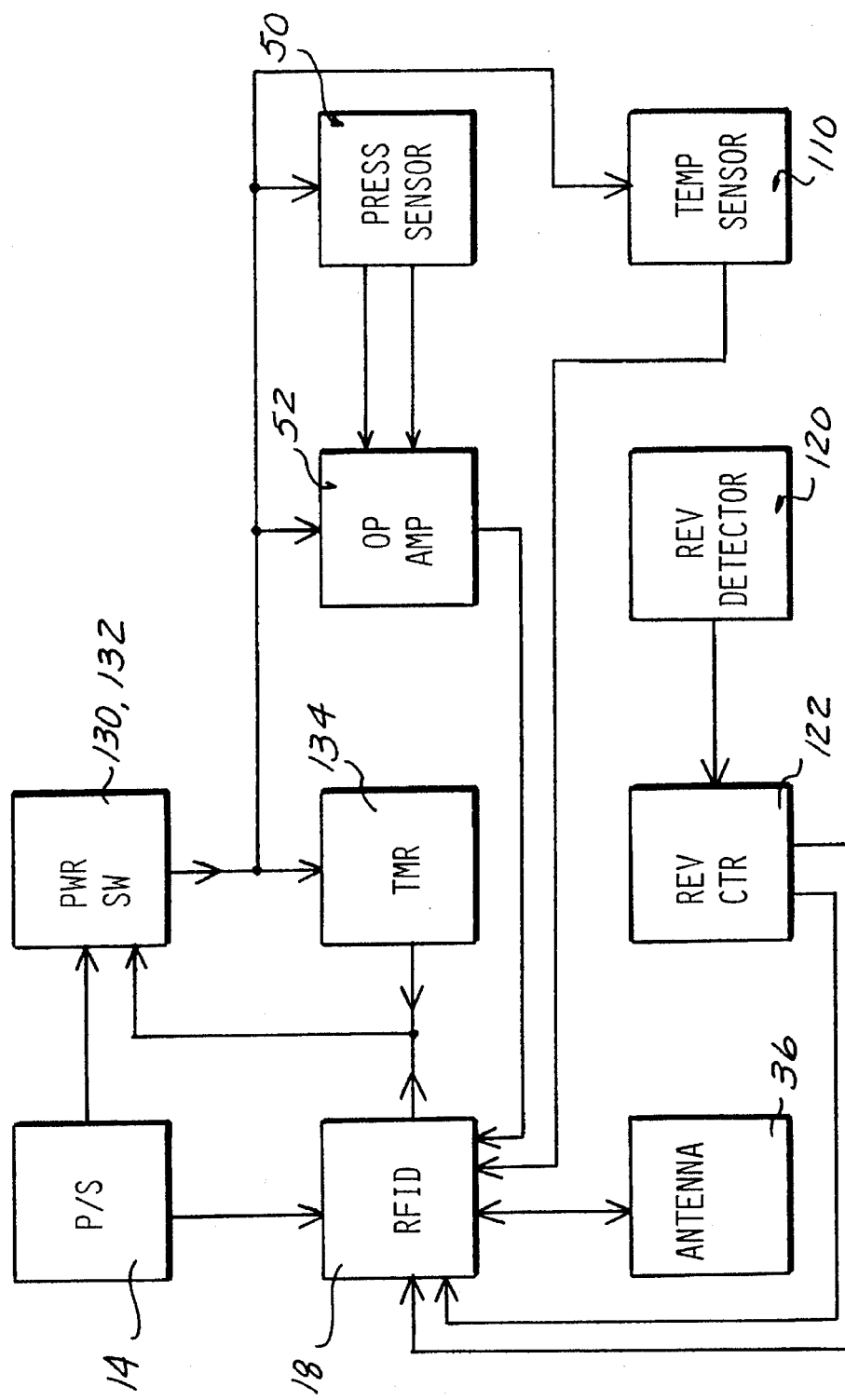
FIG. 4 is a block diagram of the major components of the transponder shown in FIGS. 1 and 2.
Figure 5:
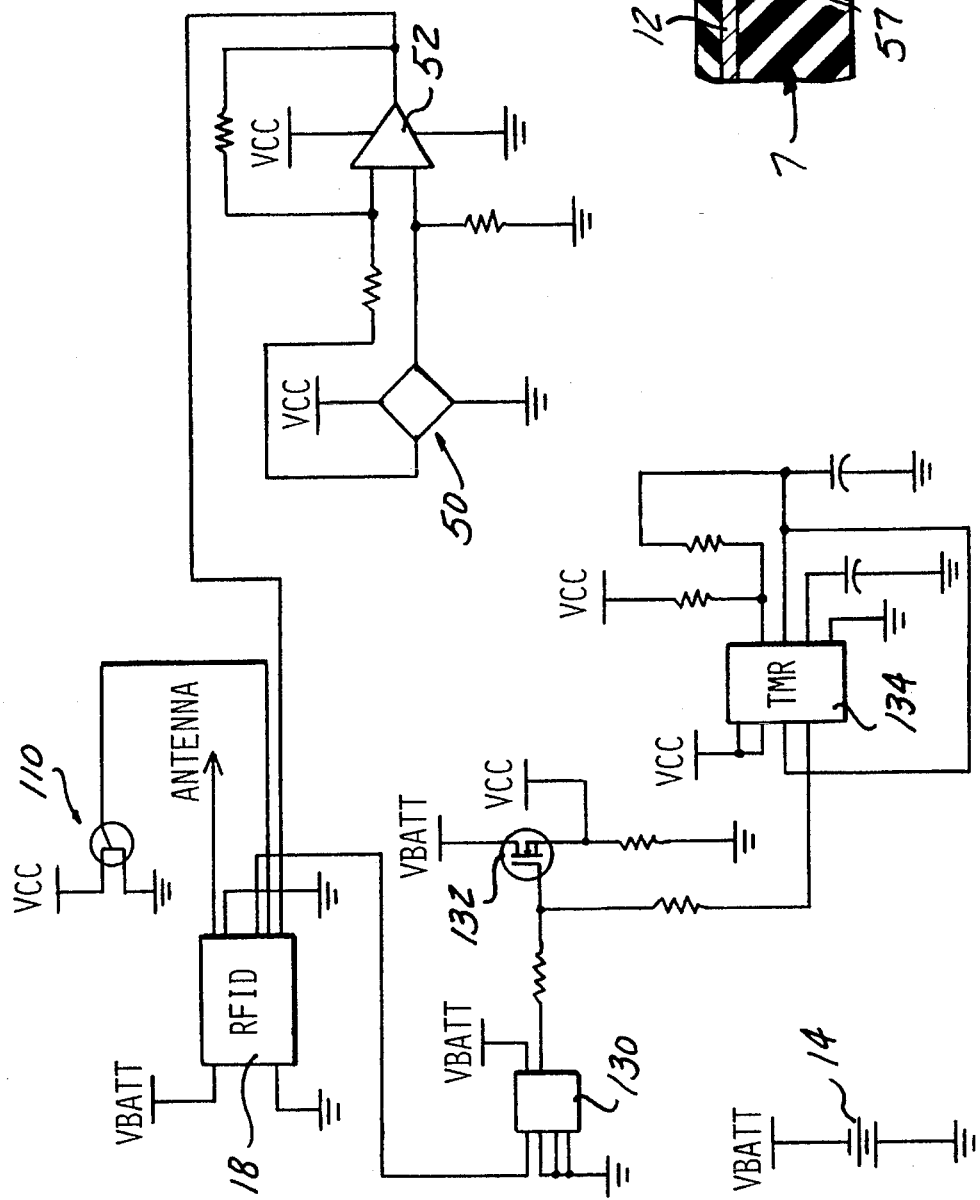
FIG. 5 is a schematic diagram of a portion of the circuitry of the transponder shown in FIGS. 1 and 2.

As shown in FIGS. 1 and 2, and in detail in FIGS. 4 and 5, the transponder 10 includes a power source, such as a battery 14, which is mounted adjacent to the substrate 12. Any suitable battery which is small in size and has a long life with a suitable amphour capacity may be employed. By way of example only, a 3.67 volt, 0.07 amp hour lithium, thionyl chloride battery, type 7–10, made by Battery Engineering, Inc., of Hyde Park, Mass. may be employed as the battery 14. This battery has an extremely small size of approximately 7.0 mm in diameter×7.8 mm long. The terminals of the battery 14 are connected to electrically conductive tracings formed in the substrate 12 to supply electrical power to the operative components of the transponder 10.

A Radio Frequency Identification Communication unit (RFID) 18 is employed in the transponder 10. The RFID 18 is in the form of a single integrated circuit chip manufactured by Micron Communications, Inc., of Boise, Id. The RFID 18 is mounted on the substrate 12 and connected by suitable conductive tracings and/or leads to the power supply or battery 14 as well as to other components as described hereafter.

A detailed block diagram of the RFID 18 is illustrated in FIG. 3. As shown in FIG. 3, the RFID 18 includes a processor means or central processing unit 20. The central processing unit 20 communicates with a memory 22 formed as an integral part of the RFID 18. The memory 22 may be any suitable type of memory, such as fusible link, ROM, RAM, SRAM, and EEPROM. The memory 22 is used to store the control program executed by the central processing unit 20 as well as various data values representative of tire operating conditions or parameters, a unique tire identification code, the specific tire location on the vehicle, etc., as described hereafter.

The central processing unit 20 receives internal analog signals from circuitry on the RFID 18. Such analog signals include a temperature sensor, such as a junction temperature diode, mounted on the RFID 18, a supply voltage monitoring sensor, magnetic detection circuits 1 and 2 and a photo detector. External inputs to the central processing unit 20 are received through a digital I/O port 26 and an analog port 28. The digital I/O port 26 receives on/off signals from suitable sensors or other devices mounted on the substrate 12 or external to the substrate 12. The analog port 28 is connected to a suitable analog output, such as a pressure sensor or a temperature sensor as described hereafter. Multiple digital or analog sensors may be multiplexed as single inputs to the digital I/O port 26 or to the analog port 28, respectively.

The central processing unit 20 of the RFID 18 communicates with an external, remotely located interrogation unit or source, described hereafter, by means of high and low power transmitters 30 and 32, respectively, and a receiver 34. The high and low power transmitters 30 and 32 and the receiver 34 are connected to an antenna 36 which is preferably mounted on the substrate 12 and connected to the RFID 18 as shown in FIGS. 1, 2 and 4. By way of example only, the antenna 36 is in the form of a microstrip or patch antenna etched directly on the substrate 12.

The high and low power transmitters 30 and 32 and the receiver 34 communicate via radio frequency signals in the unlicensed Part 15 of FCC regulations at 2.4 to 2.4835 GHz. Preferably, the communication frequency is, by way of example, 2.45 GHz. The high power transmitter 30 is selected by the RFID 18 when data from all of the tires of a vehicle on which the RFID 18 is mounted is being generated, for example. The low power transmitter 32, on the other hand, is used when only a single tire is being interrogated and used for data transmission to the remote interrogation source.

Also input to the central processing unit 20, in response to a signal received from the remote interrogation source, is the output of one of a wake-up high band and wake-up low band circuit 38 and 40, respectively. These circuits 38 and 40 look for a match with predetermined bits in the introductory portion of the interrogation signal from the remote interrogation source and provides selective energization of one or more RFID's 18 out of a large group of RFID's on one or many different vehicles. For example, a signal specifying a low band wake-up could identify the tires on one vehicle or on one group of vehicles; while the high band wake-up signal would be used to identify tires on a different vehicle or group of vehicles. The code for either the high or low wake-up band is preprogrammed into each RFID 18 to provide the desired band selection. An RFID 18 set in low band will not recognize or be woken up by an interrogation signal set for high band, and vice versa.

Also input to the receiver 34 is a portion of the signal from the remote interrogation unit detected by the antenna 36 which contains a specific tire identification code. The central processing unit 20 compares this code with the corresponding tire identification code stored in the memory 22 to determine a match therebetween and proper identification of the tire on which the RFID 18 is mounted. This unique code identification enables a single remote interrogation unit to communicate with a selected one of a large number of tires, on one or multiple vehicles. In response to the received interrogation signal, the central processing unit 20 transmits an encoded, serial radio frequency signal containing tire parameter data, as described hereafter, via either or both of the high power or low power transmitter circuits 30 and 32, respectively, to the remote interrogation source.

Figure 6:
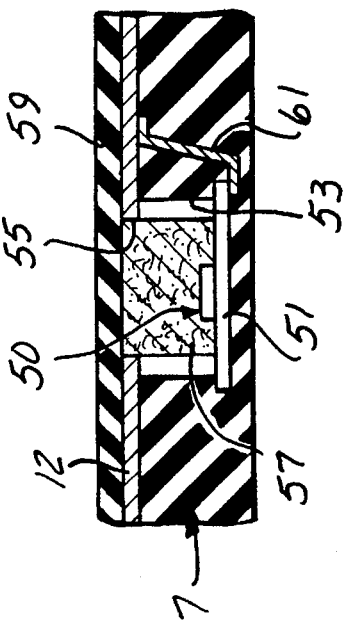
FIG. 6 is a cross-sectional view of the pressure sensor shown in FIGS. 1 and 2.

A pressure sensing means 50 is mounted on the back surface of the substrate 12 as shown in FIGS. 1 and 2 and connected by leads 61 to the conductive tracings on the substrate 12 as shown in detail in FIG. 6. An amplifier 52, FIGS. 4 and 5, may be provided on the substrate 12 to amplify the output signal of the pressure sensing means 50 prior to input to the RFID 18. Any suitable pressure sensor means 50 may be employed in the transponder 10 of the present invention which is suitable for measuring vehicle tire pressure. By way of example only, a silicone pressure sensor, model number NPC-103, made by Lucas NovaSensor of Fremont, Calif., may be employed. This sensor is a piezo-resistive sensor mounted in a ceramic surface mount package. Other types of pressure sensors may also be employed for the pressure sensing means 50.

As shown in detail in FIG. 6, the pressure sensor 50 is mounted on a ceramic base 51 joined to a sidewall which is situated in a well or recess 53 formed in and surrounded by the encapsulating medium 7. The hollow cavity formed in the sidewall opens through an aperture 55 formed in the substrate 12. A pressure transfer medium 57, such as a high temperature silicon filler, for example, is disposed in the interior cavity and extends from the upper surface of the substrate 12 into contact with the pressure sensor 50 to transfer pressure from the tire to the pressure sensor 50. The exposed surface of the pressure transfer medium 57 is covered by a thin elastomeric or rubber membrane 59 which is exposed to the tire or the air chamber within the tire and transmits the tire air pressure to the transfer medium 57. The membrane 59 also covers the entire surface of the substrate 12 mounted on the first surface 8 of the encapsulating medium 7 to act as a barrier between the air chamber of the tire and the transponder 10.

The pressure sensor 50 generates a millivolt output signal proportional to the input pressure acting thereon. This output signal is amplified by an op-amp 52, as shown in FIGS. 4 and 5, and input through the analog port 28 of the RFID 18, FIG. 1, to an analog/digital converter (ADC) 54 which digitizes the signal prior to input to the central processing unit 20. The central processing unit 20 stores the sensed pressure in the memory 22.

A temperature sensor means 110 is also be mounted on the substrate 12 for sensing the temperature of the air within the vehicle tire or the temperature of the tire itself. The temperature sensor means 110 may be suitable sensor which generates an analog output proportional to the sensed surrounding temperature. For example, a temperature sensor model no. LM 35 CAZ made by National Semiconductor, can be employed in the present invention. The output of the temperature sensor 110 is connected to and multiplexed through the analog port 28 of the RFID 18, converted to a digital value by the analog/digital converter (ADC) 54 and input to the central processing unit 20. If necessary, an amplifier can be provided to amplify the output of the temperature sensor means 110 prior to input to the RFID 18.

According to a unique feature of the present invention, the transponder 10 is provided with a tire revolution detector means 120 for detecting each revolution of the tire on which the transponder 10 is mounted. The revolution detector means 120 shown in FIG. 4 may take any suitable form, such as a magnetic detector responsive to externally generated magnetic fields which generates an output upon each complete 360° revolution of the tire. A G sensor may also be mounted on the substrate 12 to generate a signal for each up/down revolution of the sensor. The output of the revolution detector 120 means is input to a counter 122 which accumulates and stores the total tire revolution count. Upon receiving a signal from the RFID 18, the counter 122 outputs the total tire revolution count through the digital I/O port 26 to the central processing unit 20. The sensor and circuit elements forming the revolution detector 120 and the counter 122 are mounted on the substrate 12.

Figure 7:
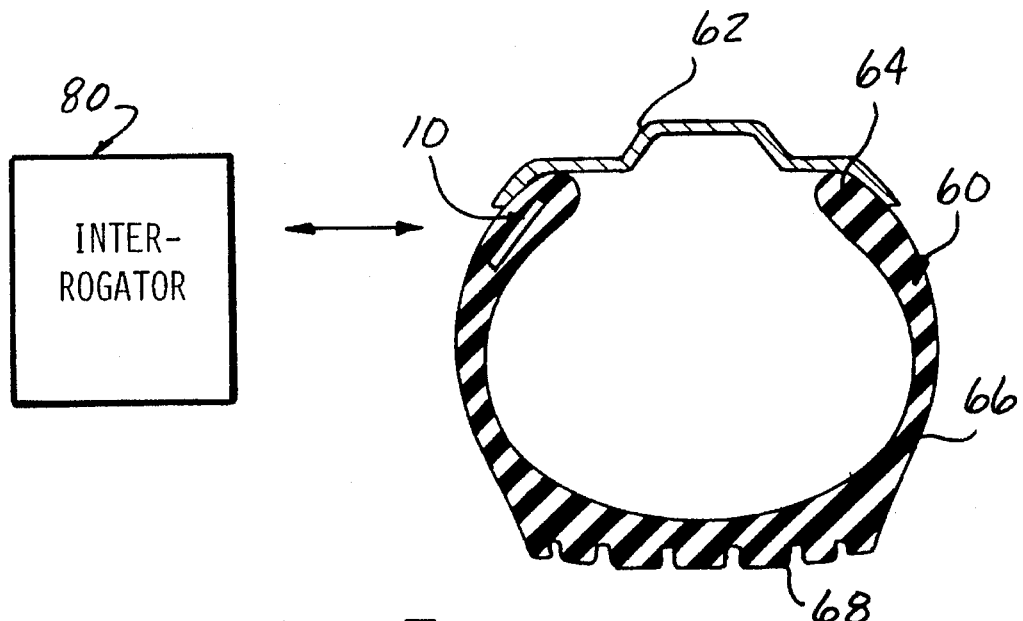
FIG. 7 is a cross sectional view showing the mounting of the integrated circuit transponder within a vehicle tire.
Figure 8:
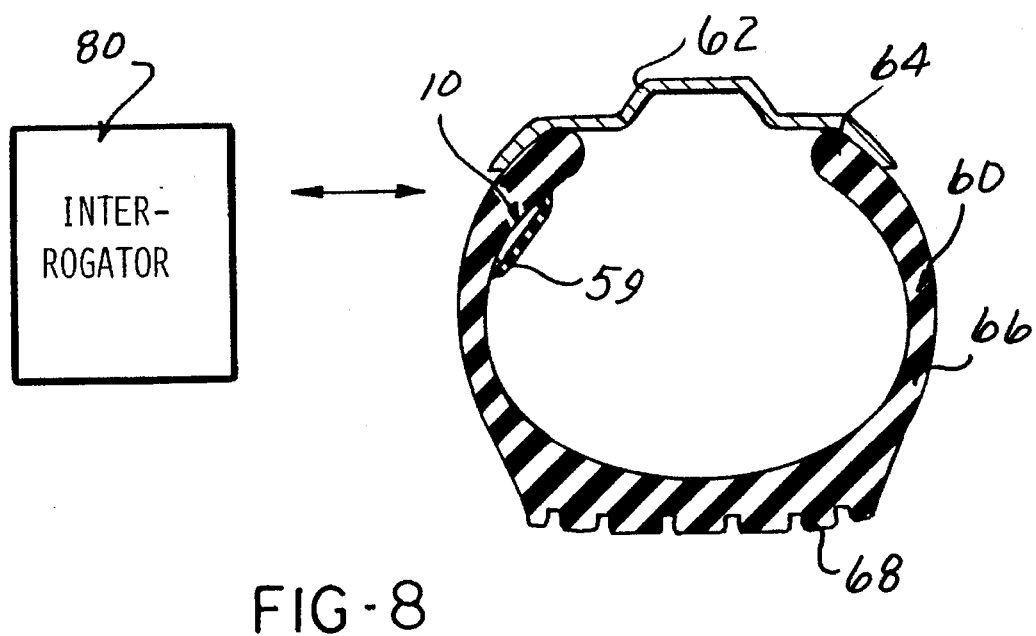
FIG. 8 is a cross sectional view showing the mounting of the integrated circuit transponder on the inner liner of a vehicle tire.

Referring now to FIGS. 7 and 8, there are depicted two mounting positions for the transponder 10 in or on a vehicle tire denoted generally by reference number 60. As is conventional, the tire 60 is mounted on a rim 62 and includes an inner bead 64 sealingly contacting the rim 62. A flexible side wall 66 extends from the bead 64 to a thread portion 68 of the tire 60. As shown in FIG. 7, the transponder 10 may be integrally mounted within the tire 60 during the manufacture of the tire 60. A suitable mounting position is in the upper portion of the side wall 66 adjacent to the bead 64 as this location exhibits the least amount of flexure during use of the tire 60.

An alternate mounting position of the transponder 10 is shown in FIG. 8. In this mounting embodiment, the transponder 10 is mounted on the inner liner of the tire 60 adjacent to the bead 64. The elastomeric patch or membrane 59 is mounted over the transponder 10 and sealingly joined to the inner liner to fixedly mount the transponder 10 in registry with the tire 60.

FIGS. 4 and 5 respectively show a block diagram of the operative elements of the transponder 10 and a detailed schematic diagram of the transponder 10 shown in FIG. 4. As shown in FIGS. 4 and 5, inputs to the RFID 18 include the output of the temperature sensor 110 which may optionally be provided through an operational amplifier 52 as shown in FIG. 4. The operational amplifier 52 also receives the output of the pressure sensor 50 and amplifies the pressure sensor output prior to inputting the signal to the analog port 28 of the RFID 18.

The power source or battery 14 provides an output voltage labeled VBATT. This voltage is input to the RFID 18 as well as to a driver 130 and a power switch circuit 132. The driver 130 is activated by a signal from the RFID 18, as described hereafter, and generates a signal to the power switch 132, such as a MOSFET. The MOSFET power switch 132 is also connected to VBATT and provides an output control voltage labeled VCC which is supplied to other components of the transponder 10, such as the temperature sensor 110 and the pressure sensor 50 to activate the temperature sensor 110 and the pressure sensor 50, to sense the appropriate temperature and pressure parameters of the tire on which the transponder 10 is mounted.

The driver 130 output signal is also input to a timer means 134 which generates an output which remains "on" for a predetermined time period. This output signal latches the control voltage VCC "on" for the predetermined time period which provides a window during which the temperature and pressure of the tire are sensed by the temperature sensor 110 and the pressure sensor 50, respectively. This time window also is used by the RFID 18 to transmit the sensed tire parameter temperature and pressure, as well as the revolution count and other parameters, as described hereafter, to the remote interrogation source which receives the tire parameter data and then retransmits the data back to the RFID 18 for storage in the memory 22 of the RFID 18.

Figure 9:
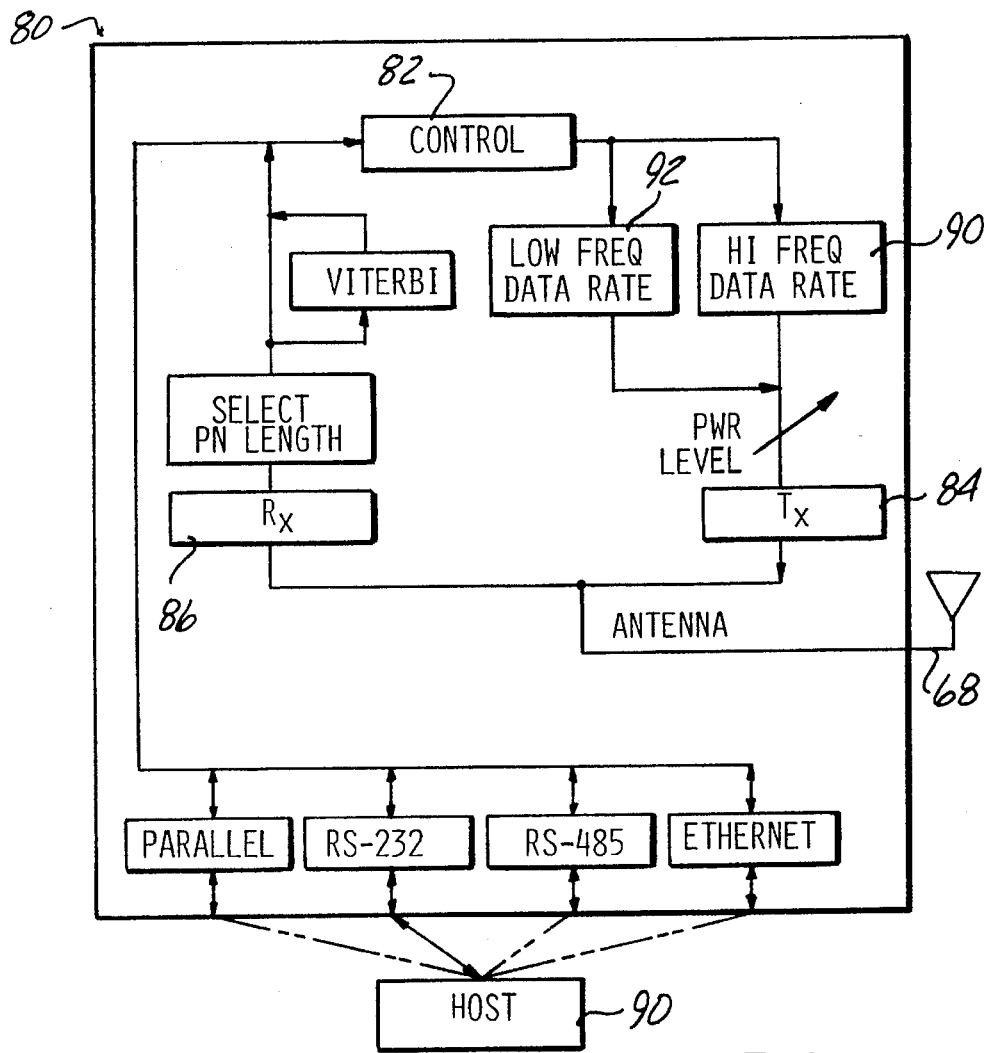
FIG. 9 is a block diagram of the remote interrogation unit.

As shown in FIGS. 7 and 8, and in greater detail in FIG. 9, a remote interrogator or interrogator source 80 is provided to communicate with the transponder 10 mounted on the vehicle tire 60. The interrogator 80 includes a control 82 in the form of a central processing unit which communicates with an internal memory storing an executable control program. The control 82 communicates through a transmitter means 84 and a receiver means 86 which are connected to an antenna 88 for generating and receiving radio frequency signals at the exemplary 2.45 GHz frequency to and from the transponder 10. As shown in FIG. 5, separate high and low frequency data rate transmissions may be provided by suitable high frequency and low frequency data rate circuits 90 and 92. By example only, the high frequency rate is 38.15 Mchip/second and the low rate is 9.538 Mchip/second.

In general, the interrogator 80 generates an interrogation signal which is transmitted by the transmitter 84 through the antenna 88 to a remotely located transponder 10. This wakes up the transponder 10, as described above, and causes the central processing unit 20 in the RFID 18 of the transponder 10 to access the memory 22 and to generate a serial, encoded radio frequency signal which is transmitted to the interrogator 80 and received through the antenna 88 by the receiver 86. This data representative of tire operating parameters or conditions may then be output from the interrogator 80 to a external host computer 90 by suitable communication circuits including parallel, RS-232, RS-485 and ETHERNET communication circuits and, also, retransmitted back to the RFID 18 for storage in the memory of the specified RFID 18.

Figure 10:
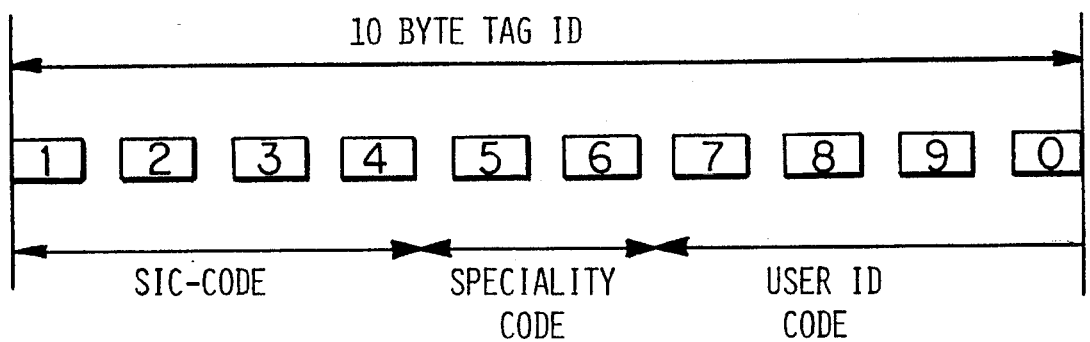
FIG. 10 is a pictorial representation of a bit code format for data communication between the integrated circuit transponder and the remote interrogation unit.

FIG. 10 depicts a standard 10 byte tag ID signal which is generated by the interrogator 80 and sent to a transponder 10 to identify a particular transponder 10 for communication with the interrogator 80. The first 4 bytes of the tag ID signal represent a standard SIC code. The next 2 bytes may be used as a specialty code which is followed by a unique user ID code of 4 bytes. This byte ID format provides over four billion unique Tag ID values for identifying one particular transponder 10 of a large number of transponders mounted on one or a number of different vehicle tires.

It will be understood that other communication protocols, including suitable preambles, Barker codes, redundancy checks, etc. are used in the communication signals transmitted between the interrogator 80 and the RFID 18 mounted in the transponder 10. Further details concerning the function and use of such communication protocols may be had by referring to the Micron RFID Communications Protocol, pre-released version 0.95, dated Jul. 22, 1993, the contents of which are incorporated herein in its entirety.

In a typical mode of operation, the RFID 18 will normally be operating at a low power level. As described above, a signal from the remote interrogator 80 on the proper high or low wake-up band 38 and 40 will activate a particular RFID 18 which will then generate the control voltage VCC through the power switch 132 to energize the various sensors 50, 110 and 122 to read the tire pressure, temperature and current tire revolution counter 122 output, which outputs are input to the RFID 18. The values, as well as other data, described below, are transmitted by the RFID 18 through the appropriate high or lower power transmitter 30 or 32, respectively, to the remote interrogator 80. The interrogator 80, in turn, retransmits the same data back to the RFID 18 for storage in the memory 22 of the RFID 18.

In addition to transmitting tire, pressure and revolution count information, the RFID 18 also transmits in each signal transmitted to the remote interrogation source 80 various other tire data or information as shown in the following table.

TABLE 1

| Parameter Name | Units | Description |
|---|---|---|
| Tire Status | N/A | Current Tire Status (Inventory, In-transit, mounted, vehicle, spare, discarded) |
| TMC Plant | N/A | TMC RP210 Plant Code |
| TMC Size | N/A | TMC RP210 Size Code |
| TMC Type | N/A | TMC RP210 Type Code |
| TMC Date | N/A | TMC RP210 Date |
| TMC Number | N/A | TMC RP210 Number |
| Vehicle ID | N/A | Vehicle ID |
| Target Pressure | kPa/6 | Desired tire pressure |
| Caution Low | kPa/6 | Low pressure caution limit |
| Caution High | kPa/6 | High pressure caution limit |
| Limit Low | kPa/6 | Low pressure limit |
| Limit High | kPa/6 | High pressure limit |
| Dual Caution Delta | kPa | Dual tire pressure differential caution limit |
| Dual Limit Delta | kPa | Dual tire pressure differential limit |
| Caution Temp | °C. + 55 | High temperature caution limit |
| Limit Temp | °C. + 55 | High temperature limit |
| Tire Location | N/A | Tire location on vehicle |
| Vehicle Tire Map | N/A | Vehicle tire location bitmap |
| Vehicle Type | N/A | Vehicle type code |
| Fleet Name | N/A | Fleet name |
| Min Pressure | kPa/6 | Minimum pressure encountered while on vehicle |
| Min Pressure Date | Days | Minimum pressure date |
| Min Pressure Distance | km/32 | Minimum pressure distance |
| Max Temperature | °C. + 55 | Maximum temperature encountered while on vehicle |
| Max Temperature Date | Days | Maximum temperature date |
| Max Temperature Distance | km/32 | Maximum temperature distance |
| Last Odo | kmx10 | Last odometer reading |
| Last Odo Date | Days | Last odometer reading date |
| Tire Total Distance | kmx10 | Total accumulated distance |
| Last Pressure | kPa/6 | Last pressure sample taken |
| Last Temperature | °C. + 55 | Last temperature sample taken |
| Last Date | Days | Last sample date |
| Last Distance | km/32 | Last sample distance |
| Fuel Used | liter x10 | Total fuel used |
| Repair Records | N/A | Number of repair records |
| Repair Record | | |
| MX DOT 1 | N/A | DOT ID of repair/retread facility |
| MX Type 1 | N/A | Retread/repair code |
| MX Date 1 | Days | Maintenance date |
| MX Distance 1 | km/32 | Tire distance at repair/retread |

During each signal transmission from the RFID 18 to the remote interrogation source 80, the various tire parameters or information shown in Table 1 are transmitted to the remote interrogation source 80. These various parameters are output from the memory 22 of the RFID 18 in serial format and transmitted serially after the preamble signal bits shown in FIG. 10. The remote interrogation source 80 can store this information for subsequent analysis, printing, etc. In addition, according to the present invention, the remote interrogation source, within the time window set by the timer 134 described above, retransmits all of the data parameters shown in Table 1, after various calculations to totalize odometer readings, as well as to provide additional information obtained from other sources, such as total fuel used, repairs, date information, etc., back to the RFID 18 for storage in the memory 22 of the RFID 18. In this manner, the RFID 18 mounted on a particular tire contains all of the tire parameters shown in Table 1 directly on each tire. These parameters may be read by any interrogation source 80 thereby providing a permanent record of the operational history of the tire.

The RFID 18 is described above as receiving an activation signal from the remote interrogation source 80 which wakes up, assuming a proper identification code match exists, the RFID 18 for sensing the various temperature, tire pressure and tire revolution count. According to the present invention, a modification to the operation of the RFID 18 may be provided by modifying the control program stored in the memory 18 such that the RFID 18 wakes up on its own accord, in addition to a wake-up caused by the receipt of an activation signal from the remote interrogation source 80. The RFID 18, in this alternate mode of operation, can generate and supply the appropriate activation signal directly to the power switch driver 130 which then activates the power switch 132 to turn on the timer 134 to set the appropriate data collection time window described above. This auto generation of the activation signal can be on a time basis at any selectible time interval.

Further, in this mode of operation, the RFID 18 functions to store in the memory 22 tire parameter information, such as pressure, temperature, current tire revolution count, at various times during the operation of the vehicle, such as once each day, once per start-up of the vehicle, etc., to provide a more accurate history of the operational characteristics of the tire. This is particularly important with respect to sensing maximum and/or minimum pressures and temperatures experienced by a particular tire during its operation.

In summary, there has been disclosed a unique active integrated circuit transponder which senses and transmits vehicle tire condition parameters to a remote interrogation unit. The transponder is small in size so as to enable it to be easily mounted within a tire during the manufacture of the tire or, in the alternative, attached to the inner liner of the tire by means of an elastomeric patch. The transponder contains an on board power source so as to accumulate tire operating parameters throughout the use of the tire and to accumulate such parameter values for communication to the interrogation unit upon receipt of an interrogation signal from the interrogation unit. In this manner, various tire parameter data, such as maximum and minimum tire pressure and temperature experienced during the use of the tire, and the accumulative number of revolutions of the tire, may be provided to obtain a complete history of the use of the tire to determine its wear, potential remaining life, safe operating condition, etc.

What is claimed is:

1. A transponder for sensing, storing and transmitting vehicle tire condition parameter data comprising:

a substrate adapted to be fixedly mountable on an inner surface of a vehicle tire;

a processor means, a memory, a receiver means connected to the processor means for receiving an interrogation signal from a source from the tire in which the substrate is mounted, and a transmitter means connected to the processor means for transmitting a signal containing data representative of sensed tire condition parameter data to a remote source, all mounted on the substrate;

sensor means, mounted on the substrate, for sensing a tire parameter and for generating an output signal to the processor means representative of the sensed tire parameter;

power supply means, mounted on the substrate, for supplying electrical power to the processor means, the memory, the receiver means, the transmitter means and the sensor means; and antenna means, mounted on the substrate and connected to the receiver means and the transmitter means, for communicating an interrogation signal from the remote source to the receiver means and for communicating a signal from the transmitter means to the remote source the processor means executing a control program stored in the memory and, in response to an interrogation signal received by the receiver means and the output signal from the sensor means, generating and supplying a signal representative of the sensor output signal to the transmitter means for transmission to a remote source.

2. The transponder of claim 1 wherein the sensor means comprises:

pressure sensor means, mounted on the substrate, for sensing air pressure of a tire on which the transponder is mounted.

3. The transponder of claim 2 wherein the pressure sensor means comprises:

a pressure transducer and a pressure transmitting medium disposed in contact with the pressure transducer and adapted to be exposed to an air chamber in a tire on which the transponder is mounted.

4. The transponder of claim 1 wherein the sensor means comprises:

temperature sensor means, mounted on the substrate, for sensing temperature of a tire on which the transponder is mounted.

5. The transponder of claim 1 wherein the sensor means comprises:

means, mounted on the substrate, for detecting and generating an output signal for each complete 360° revolution of the substrate.

6. The transponder of claim 5 wherein the detecting means further comprises:

counter means, responsive to the output signal from the detecting means, for totalizing the output signals from the detecting means as an accumulated revolution count.

7. The transponder of claim 1 wherein:

the processor means monitors the output signals of the sensor means to detect at least one of maximum and minimum values of a tire condition parameter over a predetermined time period.

8. The transponder of claim 1 wherein the receiver means and the transmitter means communicate with the remote source by a radio frequency signal.

9. The transponder of claim 8 wherein:

the processor means transmits a serial, encoded radio frequency signal containing tire condition parameter data via the transmitter means to the remote source.

10. The transponder of claim 1 further comprising:

a housing formed of an encapsulating material and encapsulating the substrate, the processor means, the memory, the receiver means, the transmitter means, the power supply, the sensor means and the antenna means.

11. The transponder of claim 1 further comprising:

timer means, responsive to an activation signal from the processor means and connected to the sensor means, for activating the sensor means to sense a tire condition parameter only during a predetermined time period set by the timer means.

12. The transponder of claim 11 wherein:

the processor means generates the activation signal to the timer means in response to an interrogation signal received from a remote source.

13. The transponder of claim 1 wherein the sensor means comprises at least one of:

pressure sensor means, mounted on the substrate, for sensing air pressure of a tire on which the transponder is mounted;

temperature sensor means, mounted on the substrate, for sensing temperature of a tire on which the transponder is mounted; and means, mounted on the substrate, for detecting and generating an output signal for each complete 360° revolution of the substrate.

14. The transponder of claim 13 wherein:

the pressure sensor means includes a pressure transducer and a pressure transmitting medium disposed in contact with the pressure transducer and adapted to be exposed to an air chamber in a tire on which the transponder is mounted; and the detecting means further comprises counter means, responsive to the output signal from the detecting means, for totalizing the output signals from the detecting means as an accumulated revolution count.

15. The transponder of claim 1 wherein the sensor means comprises:
   pressure sensor means, mounted on the substrate, for sensing air pressure of a tire on which the transponder is mounted;
   temperature sensor means, mounted on the substrate, for sensing temperature of a tire on which the transponder is mounted; and
   means, mounted on the substrate, for detecting and generating an output signal for each complete 360° revolution of the substrate.

16. The transponder of claim 15 further comprising:
   timer means, responsive to an activation signal from the processor means and connected to the pressure sensor means and the temperature sensor means, for activating the pressure sensor means and the temperature sensor means to sense tire pressure and tire temperature, respectively, only during a predetermined time period set by the timer means.

17. The transponder of claim 16 wherein:
   the processor means generates the activation signal to the timer means in response to an interrogation signal from a remote source and transmits the sensed tire pressure and temperature and a total tire revolution count from the detecting means to a remote source during the time period established by the timer means.

18. The transponder of claim 16 wherein:
   the processor means generates the activation signal separate from receiving an interrogation signal at a predetermined selectible time interval.

19. The transponder of claim 16 further comprising:
   a housing formed of an encapsulating material and encapsulating the substrate, the processor means, the memory, the receiver means, the transmitter means, the power supply, the pressure sensor means, the temperature sensor means, the revolution detecting means and the antenna means.

20. The transponder of claim 1 wherein:
   the processor means, the memory, the receiver means, and the transmitter means are formed as a single integrated circuit chip.

21. A vehicle tire parameter sensing apparatus adapted for use with a vehicle tire comprising:
   control means having an interrogator transmitter means for transmitting an interrogation signal and an interrogator receiver means for receiving remotely generated signals; and
   a transponder adapted to be fixedly mountable on an inner surface of a vehicle tire, the transponder including:
     a substrate adapted to be mountable on a vehicle tire;
     a processor, a memory, a receiver means connected to the processor means for receiving an interrogation signal from a remote source, and a transmitter means connected to the processor means for transmitting a signal containing data representative of the sensed tire condition parameter to the control means remote from the tire on which the substrate is mounted, all mounted on the substrate;
     sensor means, mounted on the substrate, for sensing a tire parameter and for generating an output signal to the processor means representative of the sensed tire parameter;
     power supply means, mounted on the substrate, for supplying electrical power to the processor means, the receiver means, the transmitter means and the sensor means; and
     antenna means, mounted on the substrate and connected to the transmitter means and the receiver means, for communicating an interrogation signal from the control means to the receiver means and for communicating a signal from the transmitter means to the control means.

22. The apparatus of claim 21 wherein the sensor means comprises:
   pressure sensor means, mounted on the substrate, for sensing air pressure of a tire on which the transponder is mounted.

23. The apparatus of claim 22 wherein the pressure sensor means comprises:
   a pressure transducer and a pressure transmitting medium disposed in contact with the pressure transducer and adapted to be exposed to an air chamber in a tire on which the transponder is mounted.

24. The apparatus of claim 21 wherein the sensor means comprises:
   temperature sensor means, mounted on the substrate, for sensing temperature of a tire on which the transponder is mounted.

25. The apparatus of claim 21 wherein the sensor means comprises:
   means for detecting and generating an output signal for each complete 360° rotation of a tire on which the transponder is mounted.

26. The apparatus of claim 25 wherein the detecting means further comprises:
   counter means, responsive to the output signal from the detecting means, for totalizing the output signals from the detecting means as an accumulated tire revolution count.

27. The apparatus of claim 21 wherein:
   the processor monitors the output signals of sensor means to detect at least one of maximum and minimum values of a tire parameter over a predetermined time period.

28. The apparatus of claim 27 wherein:
   the processor means stores the at least one maximum and minimum values of a tire parameter in the memory.

29. The apparatus of claim 21 wherein the receiver means and the transmitter means of the transponder communicate with the interrogator transmitter means and the interrogator receiver means of the control means by a radio frequency signal.

30. The apparatus of claim 29 wherein:
   the processor means transmits a serial, encoded radio frequency signal containing tire condition parameter data via the transmitter means to the control means.

31. The apparatus of claim 21 further comprising:
   a housing formed of an encapsulating material encapsulating the substrate, the processor means, the memory, the receiver means, the transmitter means, the power supply, the sensor means and the antenna means.

32. The apparatus of claim 21 further comprising:
   timer means, responsive to an activation signal from the processor means and connected to the sensor means, for activating the sensor means to sense a tire condition parameter only during a predetermined time period set by the timer means.

33. The apparatus of claim 32 wherein:
   the processor means generates the activation signal to the timer means in response to an interrogation signal received from the control means.

34. The apparatus of claim 21 wherein the sensor means comprises at least one of:
  pressure sensor means, mounted on the substrate, for sensing air pressure of a tire on which the transponder is mounted;
  temperature sensor means, mounted on the substrate, for sensing temperature of a tire on which the transponder is mounted; and
  means, mounted on the substrate, for detecting and generating an output signal for each complete 360° revolution of a tire on which the transponder is mounted.

35. The apparatus of claim 34 wherein:
  the pressure sensor means includes a pressure transducer and a pressure transmitting medium adapted to be disposed in contact with the pressure transducer and exposed to an air chamber in a tire on which the transponder is mounted; and
  the detecting means further comprises counter means, responsive to the output signal from the detecting means, for totalizing the output signals from the detecting means as an accumulated tire revolution count.

36. The apparatus of claim 21 wherein the sensor means comprises:
  pressure sensor means, mounted on the substrate, for sensing air pressure of a tire on which the transponder is mounted;
  temperature sensor means, mounted on the substrate, for sensing temperature of a tire on which the transponder is mounted; and
  means, mounted on the substrate, for detecting and generating an output signal for each complete 360° revolution of a tire on which the transponder is mounted.

37. The apparatus of claim 36 further comprising:
  timer means, responsive to an activation signal from the processor means and connected to the pressure sensor means and the temperature sensor means, for activating the pressure sensor means and the temperature sensor means to sense tire pressure and temperature, respectively, only during a predetermined time period set by the timer means.

38. The apparatus of claim 37 wherein:
  the processor means generates the activation signal to the timer means in response to an interrogation signal from the control means and transmits the sensed tire pressure and temperature and a total tire revolution count from the detecting means to the control means during the time period established by the timer means.

39. The apparatus of claim 37 wherein:
  the processor means generates the activation signal separate from receiving an interrogation signal at a predetermined selectible time interval.

40. The apparatus of claim 21 wherein:
  the processor means, the memory, the receiver means, and the transmitter means are formed as a single integrated circuit chip.

41. A method for sensing tire condition parameters comprising the steps of:
  mounting a substrate on a tire in communication with a tire;
  mounting a processor means, a memory, a receiver means connected to the processor means for receiving an interrogation signal from a remote source, and a transmitter means connected to the processor means for transmitting a signal containing data representative of sensed tire condition parameter data to a remote source, on the substrate;
  mounting sensor means on the substrate for sensing at least one tire parameter, the sensor means generating an output signal to the processor means representative of the sensed tire parameter;
  mounting a power supply on the substrate, the power supply connected to and actively supplying electrical power to the processor means, the memory, the receiver means, the transmitter means, and the sensor means;
  mounting an antenna on the substrate and connecting the antenna to the receiver means and the transmitter means; and
  executing a controlled program stored in the memory by the processor means by which in response to an interrogation signal received by the receiver means via the antenna and the output signal from the sensor means, the processor means generates and supplies a signal representative of the sensor output signal to the transmitter means for transmission to a remote source.

42. The method of claim 41 wherein the step of mounting a sensor means further comprises the step of:
  mounting a pressure sensor on the substrate for sensing air pressure of a tire; and
  disposing the pressure sensor in communication with an air chamber of a tire.

43. The method of claim 42 wherein the step of mounting the pressure sensor further comprises the steps of:
  mounting a pressure transducer on the substrate; and
  mounting a pressure transmitting medium in contact with the pressure transducer and adapted to be exposed to an air chamber in a tire.

44. The method of claim 41 wherein the step of mounting a sensor means further comprises the step of:
  mounting a temperature sensor on the substrate for sensing temperature of a tire.

45. The method of claim 41 wherein the step of mounting a sensor means further comprises the step of:
  mounting a detector on the substrate, the detector generating an output signal for each complete 360° revolution of the substrate.

46. The method of claim 45 further comprising the step of:
  providing a counter, responsive to the output signal from the detecting means, for totalizing the output signals from the detecting means as an accumulated revolution count.

47. The method of claim 41 further comprising the step of:
  monitoring the sensor means to detect at least one of maximum and minimum values of a tire condition parameter over a predetermined time period.

48. The method of claim 41 further comprising the step of:
  communicating the receiver means and the transmitter means with a remote source by a radio frequency signal.

49. The method of claim 48 further comprising the step of:
  transmitting a serial, encoded radio frequency signal containing tire condition parameter data by the transmitter means to the remote source.

50. The method of claim 41 further comprising the step of:
  forming a housing of an encapsulating material and encapsulating the substrate, the processor means, the memory, the receiver means, the transmitter means, the power supply, the sensor means and the antenna means.

51. The method of claim 41 further comprising the step of:
  activating a timer means in response to an activation signal from the processor means for activating the sensor means to sense a tire condition parameter only during a predetermined time period set by the timer means.

52. The method of claim 51 further comprising the step of:

the processor means generating the activation signal to the timer means in response to an interrogation signal received from a remote source.

53. The method of claim 41 wherein the step of mounting the sensor means comprises the steps of:

mounting a pressure sensor on the substrate for sensing air pressure of a tire;

mounting a temperature sensor on the substrate for sensing temperature of a tire; and mounting a detector means on the substrate for detecting and generating an output signal for each complete 360° revolution of the substrate.

54. The method of claim 53 wherein the step of mounting the pressure sensor comprises the steps of:

mounting a pressure transducer on the substrate; and mounting a pressure transmitting medium disposed in contact with the pressure transducer and adapted to be exposed to an air chamber in a tire.

55. The method of claim 53 further comprising the step of:

providing a counter, responsive to the output signal from the detecting means, for totalizing the output signals from the detecting means as an accumulated revolution count.

56. The method of claim 53 further comprising the step of:

activating a timer means in response to an activation signal from the processor means for activating the pressure sensor means and the temperature sensor means to sense tire pressure and tire temperature, respectively, only during a predetermined time period set by the timer means.

57. The method of claim 56 further comprising the step of:

the processor means generating the activation signal to the timer means in response to an interrogation signal from a remote source and transmitting the sensed tire pressure, the tire temperature, and a total tire revolution count to a remote source during the time period established by the timer means.

58. The method of claim 56 wherein:

the processor means generates the activation signal separate from receiving an interrogation signal at a predetermined selectible time interval.

59. The method of claim 41 further comprising the step of:
storing the sensed tire parameter in the memory.

60. The method of claim 53 further comprising the step of:
storing the sensed air pressure and the sensed temperature of the tire in the memory.

61. The method of claim 41 further comprising the steps of:

the processor means activating the sensor means to sense tire condition parameters in response to an interrogation signal from a remote source; and transmitting the sensed tire condition parameters to a remote source.

62. The method of claim 41 further comprising the steps of:

the processor means activating the sensor means to sense tire condition parameters on a predetermined selectible time interval.

* * * * *

UNITED STATES PATENT AND TRADEMARK OFFICE
CERTIFICATE OF CORRECTION

PATENT NO. : 5,483,827
DATED : January 16, 1996
INVENTOR(S) : Kulka et al.

It is certified that error appears in the above-identified patent and that said Letters Patent is hereby corrected as shown below:

The title page, showing an illustrative figure, should be deleted and substitute therefor the attached title page.

Delete figures 1, 4, and 9 and substitute figures 1, 4, and 9 as shown on the attached pages.

United States Patent [19]
Kulka et al.

[11] Patent Number: 5,483,827
[45] Date of Patent: Jan. 16, 1996

[54] ACTIVE INTEGRATED CIRCUIT TRANSPONDER AND SENSOR APPARATUS FOR SENSING AND TRANSMITTING VEHICLE TIRE PARAMETER DATA

[75] Inventors: Harvey J. Kulka, Briuon; John H. Schramm, Ann Arbor, both of Mich.

[73] Assignee: Computer Methods Corporation, Livonia, Mich.

[21] Appl. No.: 254,026

[22] Filed: Jun. 3, 1994

[51] Int. Cl.$^6$ ............................................. B60C 23/00
[52] U.S. Cl. ............................................. 73/146.5; 73/706
[58] Field of Search ............................... 340/58; 73/706, 73/146.5

[56] References Cited

U.S. PATENT DOCUMENTS

| | | |
|---|---|---|
| 2,274,557 | 2/1942 | Morgan et al. . |
| 3,232,330 | 2/1966 | Puls . |
| 3,613,075 | 10/1971 | Griffiths et al. ............................ 340/58 |
| 3,723,966 | 3/1973 | Mueller et al. . |
| 3,770,040 | 11/1973 | DeCicco . |
| 3,787,806 | 1/1974 | Church . |
| 3,893,228 | 7/1975 | George et al. . |
| 4,010,354 | 3/1977 | Apicella, Jr. et al. . |
| 4,067,235 | 1/1978 | Markland et al. ...................... 73/146.5 |
| 4,074,227 | 2/1978 | Kalmus ................................... 340/58 |
| 4,137,520 | 1/1979 | Deveau . |
| 4,160,234 | 7/1979 | Karbo et al. . |
| 4,199,991 | 4/1980 | Kodama ................................. 73/706 |
| 4,237,728 | 12/1980 | Betts et al. . |
| 4,317,126 | 2/1982 | Gragg, Jr. . |
| 4,392,382 | 7/1983 | Myers . |
| 4,446,447 | 5/1984 | McNamara . |
| 4,450,431 | 5/1984 | Hochstein . |
| 4,543,457 | 9/1985 | Peterson et al. . |
| 4,570,152 | 2/1986 | Melton et al. . |
| 4,578,992 | 4/1986 | Galasko et al. . |
| 4,588,978 | 5/1986 | Allen . |
| 4,695,823 | 9/1987 | Vernon ................................... 340/58 |
| 4,701,826 | 10/1987 | Mikkor . |
| 4,717,905 | 1/1988 | Morrison, Jr. et al. . |
| 4,730,188 | 3/1988 | Milheiser ............................... 340/825 |
| 4,734,034 | 3/1988 | Maness et al. . |
| 4,845,649 | 7/1989 | Eckardt et al. . |
| 4,851,809 | 7/1989 | McAlister ............................. 340/442 |
| 4,856,993 | 8/1989 | Maness et al. . |
| 4,862,486 | 8/1989 | Wing et al. ........................... 377/16 |
| 4,911,217 | 3/1990 | Dunn et al. . |
| 5,061,917 | 10/1991 | Higgs et al. .......................... 340/539 |
| 5,165,281 | 11/1992 | Bell ....................................... 73/718 |
| 5,181,975 | 1/1993 | Pollack et al. ....................... 152/152.1 |
| 5,218,861 | 6/1993 | Brown et al. . |
| 5,228,337 | 7/1993 | Sharpe et al. . |
| 5,231,872 | 8/1993 | Bowler et al. . |
| 5,235,850 | 8/1993 | Schurmann . |
| 5,247,831 | 9/1993 | Fioravanti . |
| 5,285,189 | 2/1994 | Nowicki et al. ...................... 340/447 |
| 5,319,354 | 6/1994 | Myatt .................................... 340/572 |
| 5,348,067 | 9/1994 | Myatt .................................... 152/152.1 |

FOREIGN PATENT DOCUMENTS 544136 11/1992 European Pat. Off. .

*Primary Examiner*—Hezron E. Williams
*Assistant Examiner*—Jewel V. Artis
*Attorney, Agent, or Firm*—Basile and Hanlon

[57] ABSTRACT

An active integrated circuit transponder with on-board power supply is mounted in or on a vehicle tire. A pressure sensor, a temperature sensor and a tire rotation sensor are mounted on a substrate along with the integrated circuit transponder chip, the power supply and an antenna. Upon receiving an interrogation signal from a remote source, the transponder activates the sensors to sense tire pressure and temperature and transmits an encoded radio frequency signal to the remote source containing serial, encoded tire identification, tire position on the vehicle, current tire pressure, current tire temperature and accumulated tire revolutions, as well as maximum and/or minimum tire and temperature pressure values encountered over a predetermined time period and other information specific to the tire.

62 Claims, 6 Drawing Sheets

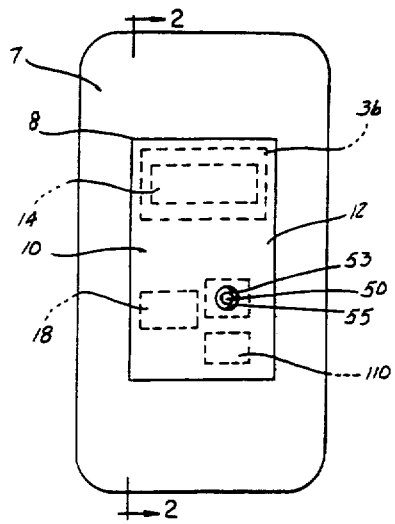

UNITED STATES PATENT AND TRADEMARK OFFICE
CERTIFICATE OF CORRECTION

PATENT NO. : 5,483,827  Page 3 of 8
DATED : January 16, 1996
INVENTOR(S) : Harvey J. Kulka and John H. Schramm It is certified that error appears in the above-indentified patent and that said Letters Patent is hereby corrected as shown below:

<u>In the Drawings:</u>

Figure 1, extending the lead line from numeral 8.

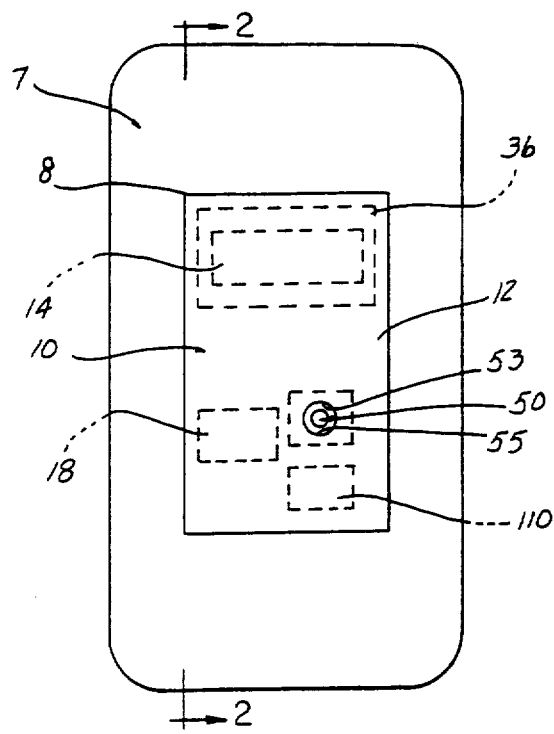

FIG-1

UNITED STATES PATENT AND TRADEMARK OFFICE
CERTIFICATE OF CORRECTION

PATENT NO. : 5,483,827
DATED : January 16, 1996
INVENTOR(S) : Harvey J. Kulka and John H. Schramm It is certified that error appears in the above-indentified patent and that said Letters Patent is hereby corrected as shown below:

Figure 4, adding an object line to numeral 122.

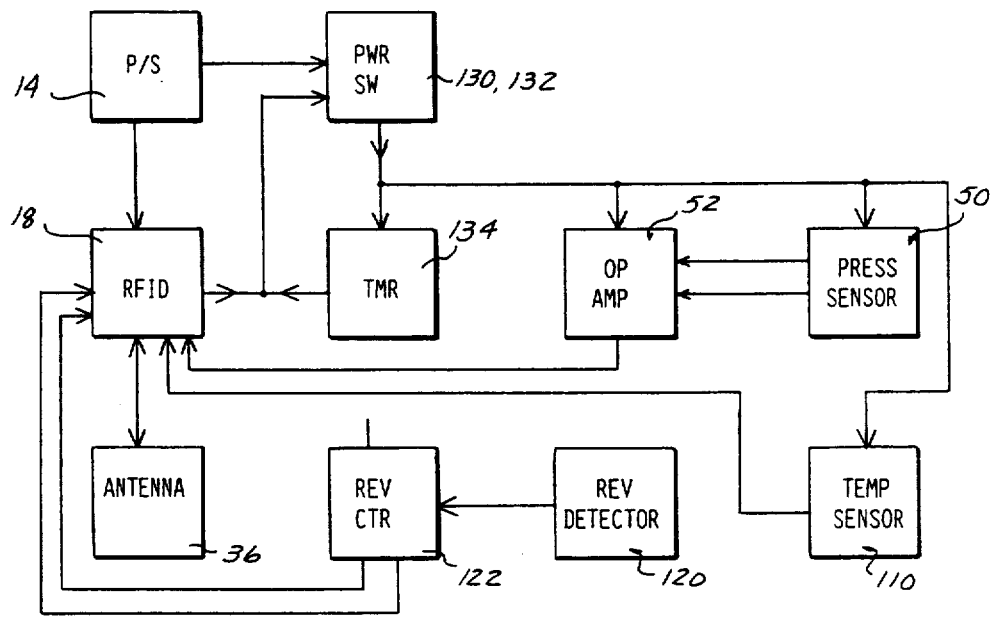

FIG-4

UNITED STATES PATENT AND TRADEMARK OFFICE
CERTIFICATE OF CORRECTION

PATENT NO. : 5,483,827  Page 5 of 8
DATED : January 16, 1996
INVENTOR(S) : Harvey J. Kulka and John H. Schramm It is certified that error appears in the above-indentified patent and that said Letters Patent is hereby corrected as shown below:

Figure 9, delete "68" and insert --88--.

Figure 9, delete "90" (host), and insert --91--.

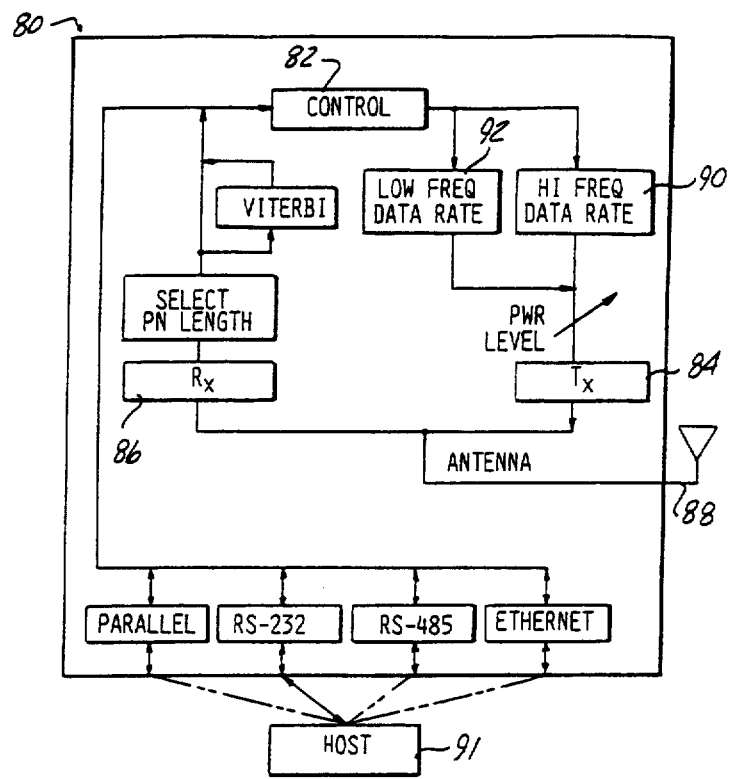

FIG-9

UNITED STATES PATENT AND TRADEMARK OFFICE
CERTIFICATE OF CORRECTION

PATENT NO. : 5,483,827
DATED : January 16, 1996
INVENTOR(S) : Harvey J. Kulka and J.H. Schramm It is certified that error appears in the above-indentified patent and that said Letters Patent is hereby corrected as shown below:

Column 1, line 5, insert -- CROSS REFERENCE TO CO-PENDING APPLICATION.

This application is a continuation of co-pending application Serial No. 08/254,026, filed June 3, 1994, in the names of Harvey J. Kulka and John H. Schramm for ACTIVE INTEGRATED CIRCUIT TRANSPONDER AND SENSOR APPARATUS FOR TRANSMITTING VEHICLE TIRE PARAMETER DATA.--

Column 4, lines 15-16, delete "with a portion of the encapsulating material removed to show the components mounted therein".

Column 5, line 56, delete "2" and insert --3--.

Column 6, line 38, after "52," insert --shown in--.

Column 7, line 5, delete "1" and insert --3--.

Column 7, line 9, after "110" delete "is" and insert --may--.

UNITED STATES PATENT AND TRADEMARK OFFICE
CERTIFICATE OF CORRECTION

PATENT NO. : 5,483,827
DATED : January 16, 1996
INVENTOR(S) : Harvey J. Kulka, J.H. Schramm It is certified that error appears in the above-indentified patent and that said Letters Patent is hereby corrected as shown below:

Column 7, line 12, after "be" insert --a--.

Column 7, line 31, delete "G" and insert --"G"--.

Column 7, line 46, delete "thread" and insert --tread--.

Column 8, line 39, delete "5" and insert --9--.

Column 8, line 56, delete "90" and insert --91--.

Column 9, line 27, after "tire," insert --temperature,--.

In the Claims:

Column 11, line 36, after "source" insert --remote--

Column 11, line 40, delete "remote".

Column 11, line 52, delete "the remote" and insert --a--.

Column 11, line 54, delete "the remote" and insert --a--.

UNITED STATES PATENT AND TRADEMARK OFFICE
CERTIFICATE OF CORRECTION

PATENT NO. : 5,483,827
DATED : January 16, 1996
INVENTOR(S) : Harvey J. Kulka, J.H. Schramm It is certified that error appears in the above-indentified patent and that said Letters Patent is hereby corrected as shown below:

Column 11, line 54, after "source" insert --;--.

Column 11, line 60, delete "remote",

Column 18, line 11, after "processor means" delete "generates" and insert --generating--.

Signed and Sealed this

Third Day of December, 1996

Attest:

BRUCE LEHMAN

*Attesting Officer*  *Commissioner of Patents and Trademarks*